United States Patent
Hoyes et al.

(10) Patent No.: US 11,177,486 B2
(45) Date of Patent: Nov. 16, 2021

(54) GASKET SEALING MATERIAL FOR FUEL CELLS

(71) Applicant: Flexitallic Investments, Inc., Houston, TX (US)

(72) Inventors: John Hoyes, Yorkshire (GB); Stephen Bond, Houston, TX (US)

(73) Assignee: Flexitallic Investments, Inc., Houston, TX (US)

(*) Notice: Subject to any disclaimer, the term of this patent is extended or adjusted under 35 U.S.C. 154(b) by 0 days.

(21) Appl. No.: 16/330,057

(22) PCT Filed: Aug. 18, 2017

(86) PCT No.: PCT/GB2017/052460
§ 371 (c)(1),
(2) Date: Mar. 1, 2019

(87) PCT Pub. No.: WO2018/042160
PCT Pub. Date: Mar. 8, 2018

(65) Prior Publication Data
US 2019/0229349 A1    Jul. 25, 2019

(30) Foreign Application Priority Data
Sep. 2, 2016 (GB) .................... 1614946

(51) Int. Cl.
*H01M 8/0282* (2016.01)
*F16J 15/10* (2006.01)
*H01M 8/124* (2016.01)

(52) U.S. Cl.
CPC ......... *H01M 8/0282* (2013.01); *F16J 15/102* (2013.01); *H01M 2008/1293* (2013.01)

(58) Field of Classification Search
CPC ............ H01M 8/0282; H01M 8/0286; H01M 8/0271; H01M 8/028
See application file for complete search history.

(56) References Cited

U.S. PATENT DOCUMENTS

| 4,271,228 A | 6/1981 | Foster et al. |
| 5,145,753 A | 9/1992 | Irino et al. |
| 5,437,767 A | 8/1995 | Halout et al. |
| 6,121,360 A | 9/2000 | Hoyes et al. |

(Continued)

FOREIGN PATENT DOCUMENTS

| CN | 104292851 | 1/2015 |
| CN | 105051959 A | 11/2015 |

(Continued)

OTHER PUBLICATIONS

International Search Report in related International Application No. PCT/GB2017/052460 dated Nov. 23, 2017, 4 pages.

(Continued)

*Primary Examiner* — Imran Akram
(74) *Attorney, Agent, or Firm* — Kilpatrick Townsend & Stockton LLP (57) ABSTRACT

A gasket sealing material for a fuel cell comprising: at least 25% dry w/w chemically exfoliated vermiculite; and at least 15% dry w/w plate-like filler; wherein the plate-like filler has an average particle size of less than or equal to 10 µm. Gaskets, fuel cells, uses of the gasket and sealing material are also defined.

10 Claims, 6 Drawing Sheets

(56) References Cited

U.S. PATENT DOCUMENTS

| | | | |
|---|---|---|---|
| 6,610,771 | B1 | 8/2003 | Hoyes et al. |
| 2002/0168314 | A1* | 11/2002 | Roemmler ............ C01B 32/225 423/448 |
| 2003/0132579 | A1 | 7/2003 | Hoyes et al. |
| 2004/0214032 | A1 | 10/2004 | Hoyes et al. |
| 2005/0209386 | A1* | 9/2005 | Atkinson ................ C04B 30/00 524/442 |
| 2009/0162672 | A1 | 6/2009 | Dunn et al. |
| 2012/0068415 | A1 | 3/2012 | Deluca et al. |
| 2012/0091668 | A1 | 4/2012 | Motegi et al. |
| 2012/0098213 | A1 | 4/2012 | Damdar et al. |
| 2013/0252128 | A1 | 9/2013 | Kim et al. |
| 2014/0030624 | A1 | 1/2014 | Czaplicki et al. |
| 2015/0031524 | A1* | 1/2015 | Takayama .............. C03C 3/078 501/14 |
| 2015/0372324 | A1* | 12/2015 | Rautanen ................. C25B 9/19 429/509 |
| 2017/0217829 | A1* | 8/2017 | Ashworth ................ C03C 8/16 |

FOREIGN PATENT DOCUMENTS

| | | |
|---|---|---|
| EP | 1682463 A1 | 7/2006 |
| GB | 2325496 A | 11/1998 |
| GB | 2420601 A | 5/2006 |
| WO | 8001576 A1 | 8/1980 |
| WO | 2005035463 A1 | 4/2005 |
| WO | 2014111735 A1 | 7/2014 |
| WO | 2016012750 A1 | 1/2016 |

OTHER PUBLICATIONS

Written Opinion in related International Application No. PCT/GB2017/052460 dated Nov. 21, 2016, 7 pages.

Flexitallic, "Thermiculite 866", Product Datasheet, 4 pages.

International Preliminary Report on Patentability from Related PCT Application PCT/GB2017/052460 dated Mar. 14, 2019, 7 pages.

Certificate of Correction from U.S. Pat. No. 9,793,556 dated Aug. 25, 2020, 1 page.

Notification of the Recording of Change, from related PCT/GB2015/051983, dated Sep. 21, 2015 (confirming change of applicant to Flexitallic Investments, Inc.), 1 page.

Assignment of U.S. Appl. No. 15/328,448 from Inventor John Ashworth to Flexitallic Investments, Inc. dated May 10, 2017, 3 pages.

Patent Application Information Retrieval assignment record Assignment of U.S. Appl. No. 15/328,448 from inventor John Ashworth to Flexitallic Investments, Inc. dated May 10, 2017, pp. 1-2.

Patent Application Information Retrieval assignment record indicating Assignments of U.S. Appl. No. 16/330,057 from inventors John Hoyes and Stephen Bond to Flexitallic Investments, Inc. dated Mar. 19 and Jun. 19, 2019, 2 pages.

Assignment of U.S. Appl. No. 16/330,057 from inventors John Hoyes and Stephen Bond, respectively, to Flexitallic Investments, Inc. dated Mar. 19 and Jun. 19, 2019. 3 pages.

Merriam-Webster's Collegiate Dictionary, "Consolidate", https://www.merriam-webster.com/dictionary/consolidate, accessed Jun. 9, 2021, 12 pages.

* cited by examiner

GASKET SEALING MATERIAL FOR FUEL CELLS

CROSS-REFERENCE TO RELATED APPLICATIONS

This application is the U.S. national phase of International Application No. PCT/GB2017/052460 filed on Aug. 18, 2017, and published on Mar. 8, 2018 as International Publication No. WO 2018/042160 A1, which application claims priority to and the benefit of British Application No. 1614946.0, filed on Sep. 2, 2016, the contents of all which are incorporated herein by reference in their entireties.

FIELD

The present invention relates to a gasket sealing material and to a gasket comprising the gasket sealing material. The present invention also relates to fuel cells or fuel cell components comprising one or more gaskets. The present invention is particularly concerned with a gasket sealing material that is soft and conformable and does not require consolidation prior to being used to form gaskets.

BACKGROUND

WO 2014/111735 discloses a gasket for sealing a fuel cell. The gasket has a core layer comprising chemically exfoliated vermiculite (CEV) and talc (as a filler). The filler has a mean particle size ($d_{50}$) of about 20 μm (±10%). The core layer has imperfections and striations on its surface, such that it requires consolidation before use in order to smooth the outer surfaces and minimise leak channels formed.

Thermiculite 866® is a sealing material that is designed for solid oxide fuel cell applications. Thermiculite 866® consists of chemically exfoliated vermiculite and a talc filler material. Thermiculite 866® is available as cut gaskets or in sheet form. Again, the Thermiculite 866® has imperfections and striations on its surface, such that it requires consolidation before use in order to smooth the outer surfaces and minimise leak channels formed.

It would be advantageous to provide a gasket sealing material that is suitable for use in a fuel cell which is soft and conformable and which does not require consolidation before being used to form a gasket.

SUMMARY

It is one aim of the present invention, amongst others, to provide a gasket sealing material which is soft and conformable and optionally which does not require consolidation before being used to form a gasket.

The present invention provides a gasket sealing material and a gasket as set forth in the appended claims. The present invention also provides a fuel cell or fuel cell component comprising one or more gaskets, in particular a solid oxide fuel cell or fuel cell component comprising one or more gaskets. Other features of the invention will be apparent from the dependent claims, and the description, which follows.

DETAILED DESCRIPTION

A first aspect of the present invention provides a gasket sealing material for a fuel cell comprising:
at least 25% dry w/w chemically exfoliated vermiculite; and
at least 15% dry w/w plate-like filler;
wherein the plate-like filler has an average particle size of less than or equal to 10 μm.

In general, herein a plate-like filler has an average width of plates of at least three times the average thickness.

In accordance with any aspect of the present invention the plate-like filler is generally selected to be able to withstand 600° C. without significant degradation leading to gasket creep. Suitable plate-like fillers may be selected from the group consisting of talc, molybdenum disulphide, hexagonal boron nitride, soapstone, pyrophyllite, vermiculite such as milled thermally exfoliated vermiculite, mica, fluoromica, powdered graphite, glass flake, metal flake, ceramic flake, or clays such as kaolinites, preferably, talc or mica, more preferably, talc.

Therefore, in one further aspect the present invention provides a gasket sealing material for a fuel cell comprising:
at least 25% dry w/w chemically exfoliated vermiculite; and
at least 15% dry w/w talc;
wherein the talc has an average particle size of less than or equal to 10 μm.

A second aspect of the invention provides a gasket preferably for sealing two mating surfaces of a fuel cell comprising a gasket sealing material according to the first or further aspect of the invention.

A third aspect of the invention provides a fuel cell or fuel cell component comprising one or more gaskets according to the second aspect of the invention.

A fourth aspect of the invention provides a method for producing a gasket sealing material according to the first or further aspect of the invention.

A fifth aspect of the invention provides a method of producing a gasket according to the second aspect of the invention.

A sixth aspect of the invention provides a method of producing a fuel cell or of sealing a fuel cell comprising incorporating at least one gasket according to the second aspect of the invention.

A seventh aspect of the invention provides a use of a gasket sealing material according to the first or further aspect of the invention in forming a gasket adapted for sealing a fuel cell.

An eighth aspect of the invention provides the use of a gasket sealing material according to the first or further aspect of the invention in sealing one or more mating surfaces in a fuel cell.

A ninth aspect of the invention provides a method of sealing one or more mating surfaces in a fuel cell comprising locating the gasket sealing material according to the first or further aspect of the invention at the mating surfaces or coating the mating surfaces with the gasket sealing material according to the first or further aspect of the invention.

Throughout this specification, the term "comprising" or "comprises" means including the component(s) specified but not to the exclusion of the presence of other components.

The fuel cells herein may be of any suitable type but are generally solid oxide fuel cells.

The sealing of the fuel cell may be between cells in a stack or between cells and an end plate or between other mating surfaces thereof. Accordingly, mating surfaces herein include cells in a stack or cell and end plate mating surfaces.

The optional features set out herein may be used either individually or in combination with each other where appropriate and particularly in the combinations as set out in the accompanying claims. The optional features for each exemplary embodiment of the invention, as set out herein are also applicable to any other aspects or exemplary embodiments of the invention, where appropriate. In other words, the skilled person reading this specification should consider the optional features for each aspect or embodiment of the invention as interchangeable and combinable between different aspects of the invention.

The first aspect of the invention provides a gasket sealing material for a fuel cell. The gasket sealing material comprises at least 25% dry w/w chemically exfoliated vermiculite (cev); and at least 15% dry w/w plate-like filler; wherein the filler has an average particle size of less than or equal to 10 μm. The filler may be present at at least 25% dry w/w gasket sealing material, more preferably, at at least 30% dry w/w gasket sealing material, most preferably, at at least 40% dry w/w gasket sealing material. The filler may be present in a range of 15-75% dry w/w gasket sealing material, more preferably, 30-70% dry w/w, most preferably, 40-60% dry w/w.

The further aspect of the invention provides a gasket sealing material for a fuel cell. The gasket sealing material comprises at least 25% dry w/w chemically exfoliated vermiculite (CEV); and at least 15% dry w/w talc; wherein the talc has an average particle size of less than or equal to 10 μm. The talc may be present at at least 25% dry w/w gasket sealing material, more preferably, at at least 30% dry w/w gasket sealing material, most preferably, at at least 40% dry w/w gasket sealing material. The talc may be present in a range of 15-75% dry w/w gasket sealing material, more preferably, 30-70% dry w/w, most preferably, 40-60% dry w/w.

The CEV may be present at at least 30% dry w/w gasket sealing material, more preferably, at at least 35% dry w/w gasket sealing material, most preferably, at at least 40% dry w/w gasket sealing material. The CEV may be present in a range of 25-85% dry w/w gasket sealing material, more preferably, 30-70% dry w/w, most preferably, 40-60% dry w/w The gasket sealing material of the first or further aspect of the invention may be provided in any suitable form, such as in the form of a sheet. Such sheets can be cut or formed into appropriate shapes for use as a gasket or as a sealing layer of a gasket.

Alternatively, the gasket sealing material may be applied by coating whilst wet onto the mating surfaces followed by drying.

Suitably, the gasket sealing material of the first or further aspect of the invention has a density prior to use of less than or equal to 1.1 $g/cm^3$, more preferably, less than or equal to 1.0 $g/cm^3$, most preferably, less than or equal to 0.9 $g/cm^3$. For example, the gasket sealing material of the first or further aspect of the invention may have a density prior to use of from 0.75 to 1.1 $g/cm^3$, such as from 0.85 to 1.1 $g/cm^3$, particularly of from 0.85 to 0.95 $g/cm^3$. Preferably, the gasket sealing material of the first or further aspect of the invention may have a density prior to use of from 0.7 $g/cm^3$. Preferably, the gasket sealing material of the first or further aspect of the invention may have a density prior to use of from 0.8 $g/cm^3$.

It is believed that the relatively low density of the gasket sealing material of the first or further aspect of the invention provides advantages in use in fuel cells. For example, it is believed that the low density of the gasket sealing material results in the material being soft and readily conformable. The gasket sealing material has been found to be readily compressible such that it provides improved sealing and compensates for thickness tolerances in fuel cell stacks. Additionally, the low density gasket sealing material does not necessarily require consolidation before use.

Suitably, the gasket sealing material of the first aspect of the invention comprises at least 40% dry w/w chemically exfoliated vermiculite and at least 30% dry w/w plate-like filler. For example, the gasket sealing material of the first aspect of the invention may comprise at least 40% dry w/w chemically exfoliated vermiculite and at least 40% dry w/w plate-like filler. Preferably, the gasket sealing material of the first aspect of the invention may comprise about 45 to 55% dry w/w chemically exfoliated vermiculite and about 45 to 55% dry w/w plate-like filler.

Suitably, the gasket sealing material of the further aspect of the invention comprises at least 40% dry w/w chemically exfoliated vermiculite and at least 30% dry w/w talc. For example, the gasket sealing material of the further aspect of the invention may comprise at least 40% dry w/w chemically exfoliated vermiculite and at least 40% dry w/w talc. Preferably, the gasket sealing material of the further aspect of the invention may comprise about 45 to 55% dry w/w chemically exfoliated vermiculite and about 45 to 55% dry w/w talc.

Vermiculite is a hydrous phyllosilicate mineral generally understood to be an altered mica mineral. The term vermiculite therefore also extends to related minerals understood to have been formed in the same or a similar manner and commonly known as vermiculite such as hydrobiotite.

Chemically exfoliated vermiculite (CEV) is formed by chemically treating the vermiculite ore and swelling it in water. In one possible preparation method, the ore is treated with saturated sodium chloride solution to exchange magnesium ions for sodium ions, and then with n-butyl ammonium chloride to replace sodium ions with n-butyl ammonium ions. Alternatively, the ore may be treated with saturated lithium citrate solution in a one step process. On washing of the treated ore with water swelling takes place. The swollen material is then subjected to high shear to produce an aqueous suspension of very fine (diameter below 50 μm) vermiculite particles. Other chemical treatment agents are known to those skilled in the art. The water may be removed from the suspension to form dry CEV particles. However, the CEV is more generally used in this slurry form.

Nevertheless, dry CEV may be prepared by a suitable drying technique such as those well known to the skilled person. Suitable drying techniques include cake drying and pulverising; film drying and pulverising; rotary hot air drying; spray drying; freeze drying; pneumatic drying; fluidised bed drying of partially dried solid; and vacuum methods including vacuum shelf drying.

The talc functions in the same way as a filler in the gasket sealing material.

Any suitable plate-like filler may be used provided that it has an average particle size of less than or equal to 10 μm.

An example of a suitable talc is Magsil Ultrafine Diamond D2500 available from Richard Baker Harrison Limited.

Suitably, more than 25% dry w/w, more preferably more than 50% dry w/w, most preferably, more than 75% dry w/w, especially, more than 90% dry w/w of the plate-like filler in the gasket sealing material of the invention has a particle size of greater than 2 μm.

Preferably, the plate-like filler has an average particle size of from 2 to 10 μm, such as from 2 to 6 μm. In particular, the plate-like filler may have an average particle size of from 3 to 6 μm, for example an average particle size of about 5 to 6 μm.

A suitable way of determining particle size is using a Malvern Mastersizer 3000 Hydro.

Suitably, the gasket sealing material of the first or further aspect of the invention does not require consolidation before use in forming a gasket.

Suitably, the gasket sealing material of the first or further aspect of the invention comprises a combination of chemically exfoliated vermiculite and plate-like filler/talc equal to or in excess of 95% dry w/w, more preferably, in excess of 96% w/w, most preferably, in excess of 98% w/w, especially, greater than 99% w/w or approximately 100% w/w.

The gasket sealing material of the first or further aspect of the invention may comprise one or more additives, for example in the range of 0 to 10% or 0 to 8% dry w/w, more typically from 0 to 5% dry w/w, most typically of 0 to 3% dry w/w, of the gasket sealing material. Suitable additives may be selected from reinforcing agents such as milled glass, fibre, rubber or other fillers.

It will be appreciated that the combined level of chemically exfoliated vermiculite and plate-like filler/talc will not exceed 100% dry w/w in the gasket sealing material and may, in addition to the levels above, be from 90% dry w/w in the presence of other additives so that in any case the level selected in the ranges above should be combined accordingly.

The second aspect of the invention provides a gasket for sealing two mating surfaces of a fuel cell comprising a gasket sealing material according to the first or further aspect of the invention. All of the features of the gasket sealing material discussed in relation to the first or further aspect of the invention also relate to the gasket formed from the gasket sealing material.

Preferably, the solid oxide fuel cell (SOFC) herein includes solid oxide electrolyzer cell (SOEC). The gasket of the present invention is preferably a gasket for use in a SOFC or a SOEC to reduce gas leakage.

It will be appreciated that the gasket sealing material may be used in other suitable gasket applications in addition to fuel cells. Typical embodiments include steel core gaskets for various industrial applications.

The gasket of the second aspect of the invention may be multi-layered or unilayered. In the case of a unilayered gasket, the gasket sealing material is shaped so as to form the entire gasket, whereas in a multi-layered gasket (which may have two or more layers) the gasket sealing material may form one or more sealing layers of the gasket and the other layers may independently be comprised of a separate core layer, a or multiple coating layers, a or multiple support layers and/or other layers. For example, the gasket sealing material of the second aspect may form the core layer and may have other coating layers. Still further, the gasket may be in the form of a core interposed between two sealing material layers according to the first or further aspect which are typically but not necessarily generally contiguous therewith. Such gaskets are typically shaped so as to be interposed between mating surfaces of mating parts to thereby provide a seal therebetween. Alternatively, the gasket may be in the form of a support layer and a sealing material layer thereon which is typically but not necessarily generally contiguous therewith. The gasket may be in the form of a laminate but the support layer may also be interpenetrated by the sealing layer. Such interpenetration may be effected by, for example a gauze or wire mesh support interpenetrated by the sealing layer to thereby reinforce the sealing layer.

In a multi-layered gasket, further layers may be applied to the sealing material layer. For instance, the sealing layer may have a further layer or coating interposed between the sealing layer and the respective mating surface, in use. Such further layers are known to the skilled person and depend on the application in which the gasket is to be used.

The gasket of the second aspect of the invention may comprise a sealing layer comprised of the gasket sealing material according to the first or further aspect of the invention and optionally a core layer, optionally, one or more coating layer(s) and/or optionally, a support for the sealing layer.

The gasket of the second aspect of the invention may comprise a core layer comprised of the gasket sealing material according to the first or further aspect of the invention, wherein the core layer is interposed between a first and second coating layer. Any suitable coating layer(s) may be used, including for example coating layers comprising glass, glass-ceramic and/or ceramic material known to the skilled person and suitable for fuel cell applications.

When present, the coating layers preferably cover at least a part of the surface of the sealing layer. Generally, the coating layers are contiguous with the sealing layer so as to cover substantially the entire surface of the sealing layer. However, the coating layers may overlap the edges of the sealing layer to merge at their respective peripheries to thereby seal the sealing layer within the coating layers. Preferably, the coating layers form an, or both, outer layer(s) of the gasket such that the coating layers are in contact with the respective mating surfaces in use. More preferably, the gasket layers are arranged such that substantially none of the sealing layer contacts the mating surfaces in use. However, it is also possible to have less than 100% coating coverage of the sealing layer and optionally for some of the sealing layer to also contact the mating surfaces in use.

The third aspect of the invention provides a fuel cell or fuel cell component comprising one or more gaskets according to the second aspect of the invention. Preferably, the fuel cell is a solid oxide fuel cell (SOFC) or a solid oxide electrolyzer cell (SOEC). All of the features of the gasket discussed in relation to the second aspect of the invention also relate to the fuel cell or fuel cell component comprising the gaskets.

The fourth aspect of the invention provides a method for producing a gasket sealing material according to the first or further aspect of the invention. The method comprises mixing the chemically exfoliated vermiculite and the plate-like filler/talc to form a mixture thereof. The chemically exfoliated vermiculite may be in slurry form or dry prior to mixing or may be a combination of slurry form and dry form to increase solids content prior to drying. All of the features of the gasket sealing material discussed in relation to the first or further aspect of the invention also relate to the method for producing it.

Suitably, the chemically exfoliated vermiculite and the plate-like filler/talc are intimately mixed and preferably, each evenly distributed throughout the gasket sealing material so that they form a generally homogeneous mixture.

The method may comprise mixing the chemically exfoliated vermiculite in slurry form and dry plate-like filler/talc. In the slurry form, the liquid acts as a diluent and is generally water. However, in principle any suitable liquid diluent may be used. When the liquid diluent is water, this may be added to the mixture or may be present as a diluent with which the chemically exfoliated vermiculite and/or plate-like filler/talc is supplied. For example, the chemically exfoliated vermiculite may be supplied in the form of a suspension in water, which may be prepared directly from the vermiculite ore.

The method of the fourth aspect of the invention may comprise the step of drying the mixture (i.e. after mixing). Any suitable drying method may be used. For example, the mixture may be dried in a conventional oven or may in a fuel cell application be dried during heating of the fuel cell. The length and temperature of the drying step will depend, for example, upon the exact content of the mixture. Typically, the liquid diluent generally evaporates during drying but in practice some residual liquid diluent may also be present in the dried mixture/gasket sealing material.

The method of the fourth aspect of the invention may comprise the step of forming a sheet from the mixture. Typically, when the method includes the step of forming a sheet then the sheet so formed may be dried by any suitable method.

A fifth aspect of the invention provides a method of producing a gasket according to the second aspect of the invention.

The method of the fifth aspect of the invention may comprise the steps of:
producing a gasket sealing material according to the first or further aspect of the invention; and
optionally, forming (preferably cutting) the gasket sealing material into the required gasket shape.

Suitably, the gasket (once produced) is located in a fuel cell between mating surfaces to be sealed.

The method of the fifth aspect of the invention may comprise the steps of:
producing a gasket sealing material according to the first or further aspect of the invention;
coating the gasket sealing material onto one or more of the mating surfaces to be sealed;
mating the surfaces coated with the gasket sealing material together; and
optionally heating the gasket.

In this method, the gasket sealing material is typically coated onto the mating surface(s) in the form of a liquid suspension or paste-type formulation.

The method of the fifth aspect of the invention may comprise the steps of:
producing a gasket sealing material according to the first or further aspect of the invention;
optionally, forming (preferably cutting) the gasket sealing material into the required gasket shape to provide a core layer; and
coating one or each of the opposed surfaces of the core layer with a coating layer.

Suitably, the gasket (once produced) is located in a fuel cell between mating surfaces to be sealed. The coating may be applied to the gasket core layer before or after location on the mating surface. For example, the mating surface may be coated with a coating layer, the gasket core layer may be located on the coating layer and then a further coating layer may be coated on the core layer. A suitable coating layer is a glass, glass-ceramic or ceramic suitable for fuel cell applications.

All of the features of the gasket discussed in relation to the second aspect of the invention also relate to the method of producing the gasket.

The sixth aspect of the invention provides a method of producing a fuel cell or of sealing a fuel cell. The method comprises incorporating at least one gasket according to the second aspect of the invention into the fuel cell. Preferably, the fuel cell is a solid oxide fuel cell (SOFC) or a solid oxide electrolyzer cell (SOEC). All of the features of the gasket discussed in relation to the second aspect of the invention also relate to the gasket incorporated into the fuel cell.

The seventh aspect of the invention provides the use of a gasket sealing material according to the first or further aspect of the invention in forming a gasket adapted for sealing a fuel cell. Preferably, the fuel cell is a solid oxide fuel cell (SOFC) or a solid oxide electrolyzer cell (SOEC). All of the features of the gasket sealing material discussed in relation to the first or further aspect of the invention also relate to the use of the gasket sealing material.

The eighth aspect of the invention provides the use of a gasket sealing material according to the first or further aspect of the invention in sealing one or more mating surfaces in a fuel cell. Preferably, the fuel cell is a solid oxide fuel cell (SOFC) or a solid oxide electrolyzer cell (SOEC). All of the features of the gasket sealing material discussed in relation to the first or further aspect of the invention also relate to the use of the gasket sealing material.

The ninth aspect of the invention provides a method of sealing one or more mating surfaces in a fuel cell comprising locating the gasket sealing material according to the first or further aspect of the invention at or coating the mating surfaces with the gasket sealing material according to the first or further aspect of the invention. Preferably, the fuel cell is a solid oxide fuel cell (SOFC) or a solid oxide electrolyzer cell (SOEC).

All of the features of the gasket sealing material discussed in relation to the first or further aspect of the invention also relate to the use of the gasket sealing material.

For a better understanding of the invention, and to show how the invention may be carried into effect, reference will now be made, by way of example, to the following experimental data and figures in which:—

EXAMPLES

Generally, to prepare examples herein most of the liquids are added first, then the plate-like filler such as talc is added in thirds with mixing in between additions. Then the last of the liquid (slurry) is added at the end, before a final, longer stirring stage. Mixing in this way is found to prevent lumps of plate-like filler forming and in the mixture.

Example 1 is produced as follows:—
Vermiculite slurry (microlite HTS available from Specialty Vermiculite Products) 62.5 kg
Magsil D2500 talc 9.9 kg ($d_{50}$ average particle size 5.3 microns)
De-ionised water 20.3 kg Comparative example 1 was produced as follows:—
Vermiculite slurry102.6 kg
Magsil D200 talc 19.4 kg ($d_{50}$ average particle size 21.3 microns)

In the case of both example 1 and comparative example 1, ingredients are added in a controlled manner by using a dedicated mixer. The mixer has a blender (propeller) and an agitator (paddles) which operate independently. Both these have different speed settings during the mixing cycle. The agitator is operated at 57.5 rpm (side scraper paddles). The blender is operated at 412.8 rpm ("propeller" blade at bottom of mixing vessel).

Procedure
1. Add 47 kg Slurry
2. Add 20.3 kg water
3. Over 3 mins add 3.3 kg talc with agitator at 35% power with agitator alternating its direction periodically and blender at 100% power (blender does not alternate direction)
4. Mix for 1 min with agitator and blender as step 3
5. Over 3 mins add 3.3 kg talc with agitator and blender as step 3
6. Mix for 1 min
7. Over 3 mins add 3.3 kg talc with agitator and blender as step 3
8. Add 15.5 kg of slurry
9. Mix for 2 mins with agitator and blender as step 3
10. Then mix for a further 35 mins with agitator at 35% (alternating directions periodically) and blender at 90%.

Method of Application

The pastes of the examples described above are applied in the form of a slurry. The slurry is applied to a forming sheet and a doctor blade is set up at an appropriate "wet thickness" that is calculated from knowing the wet solids content and the desired dry thickness. If a desired dry film of approximately 0.5 mm is required then the appropriate wet film is cast and allowed to dry at room temperature for 48 hours, whereupon the film of dried paste is removed from the forming sheet.

Test Samples of Example 1 and Comparative Example 1 were produced according to the following specifications.

Annular Gasket size 40 mm OD×30 mm ID

The leak test used the following test conditions:—
Pressure: 100 mbar of helium
Gasket Stress: 5 MPa
Duration: 48 hours at each temp. 600, 700, 800° C.
Pressure drop measurements: every 1 hour (dwell for 1 hour then measure for 1 hour, dwell for 1 hour, measure for 1 hour for 48 hours total)
Platens Steel 253Ma smooth surface (high temperature stainless steel)
Heating method: Clam shell furnace.
Heating rate: 5° C. per min.

Figure 1:
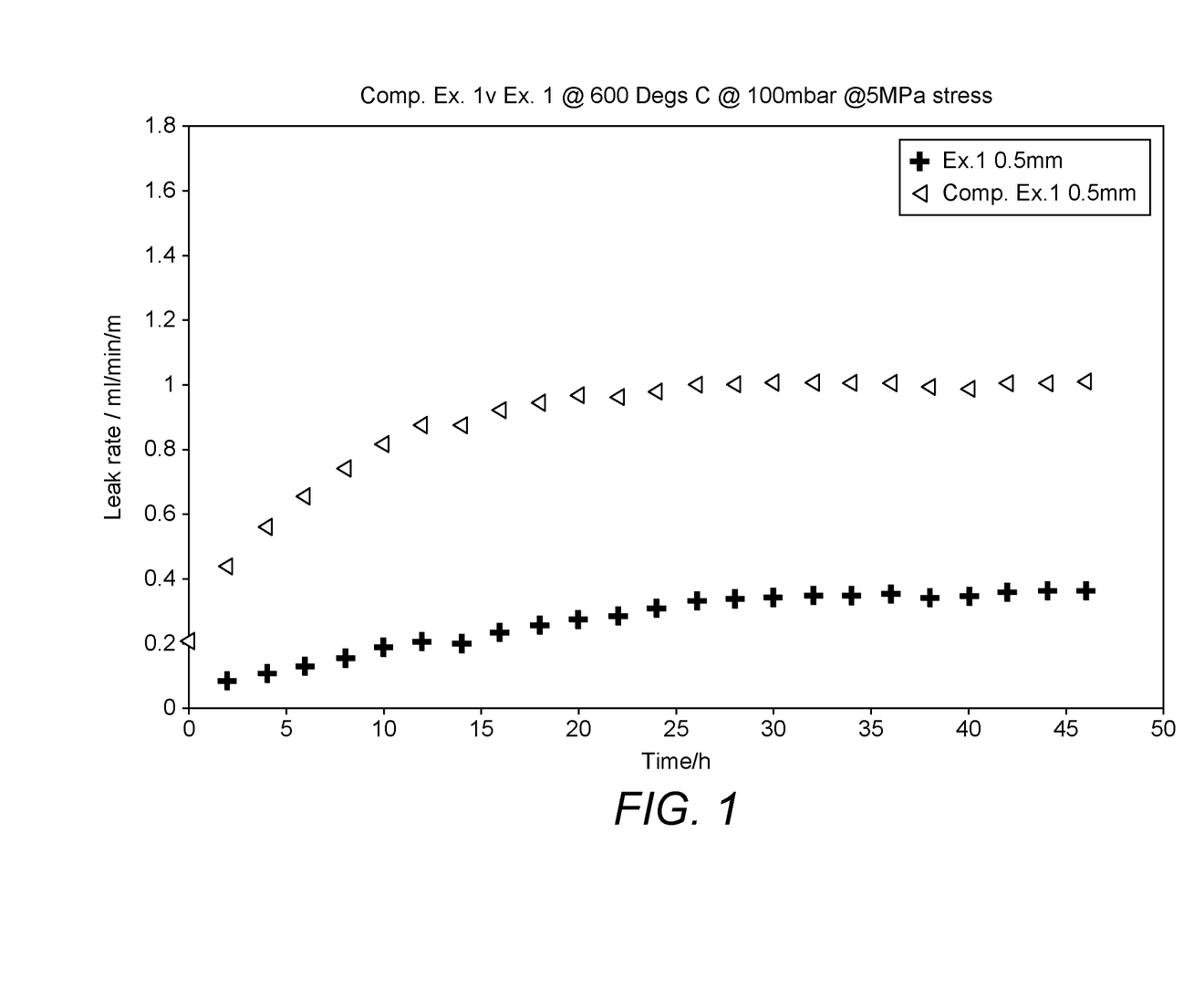
FIG. 1 is a graph of leak rate as a function of time for a gasket described herein and a comparative gasket.
Figure 2:
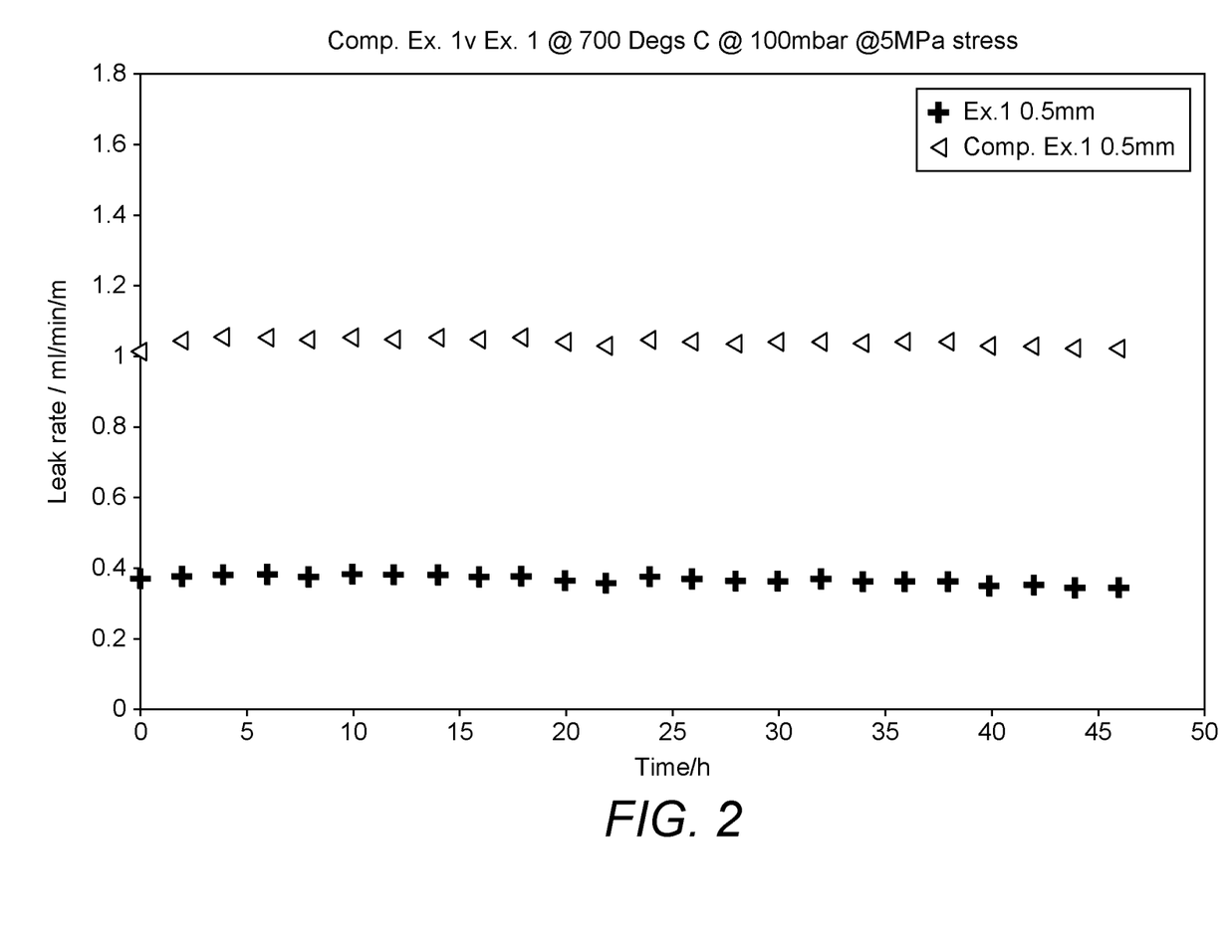
FIG. 2 is a graph of leak rate as a function of time for a gasket described herein and a comparative gasket.
Figure 3:
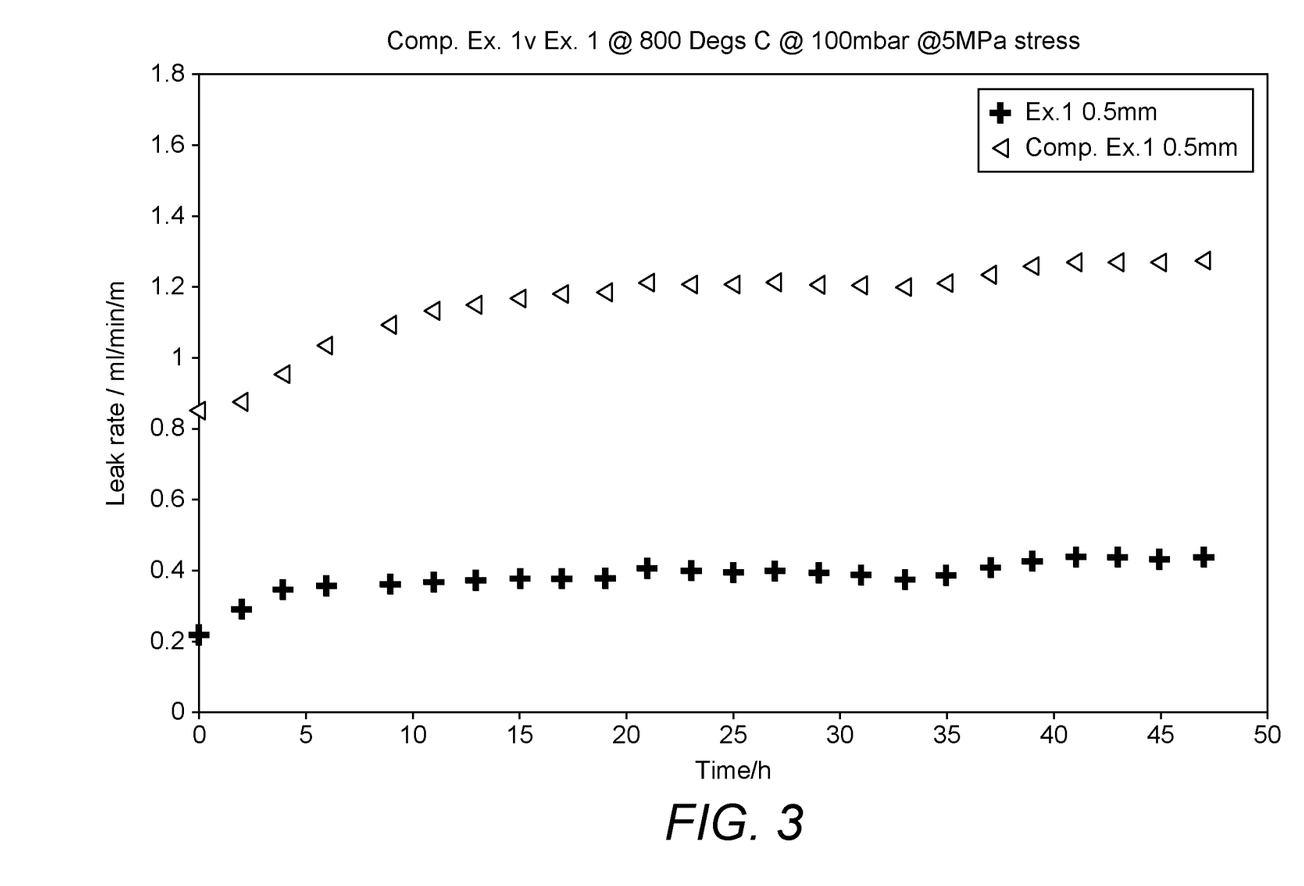
FIG. 3 is a graph of leak rate as a function of time for a gasket described herein and a comparative gasket.

Test results are shown in FIGS. 1 to 3, which demonstrate the leak rate as a function of time for example 1 and comparative example 1. The leak rate is expressed as mg of gas (helium), per meter of gasket circumference (technically the circumference at the midpoint of the distance between the ID and OD), per second. In each case the gasket stress was 5 MPa, and the internal gas pressure was 100 mbar. The gasket size was 40 mm OD, 30 mm ID. Thickness of sample was 0.5 mm as shown on chart.

Figure 4:
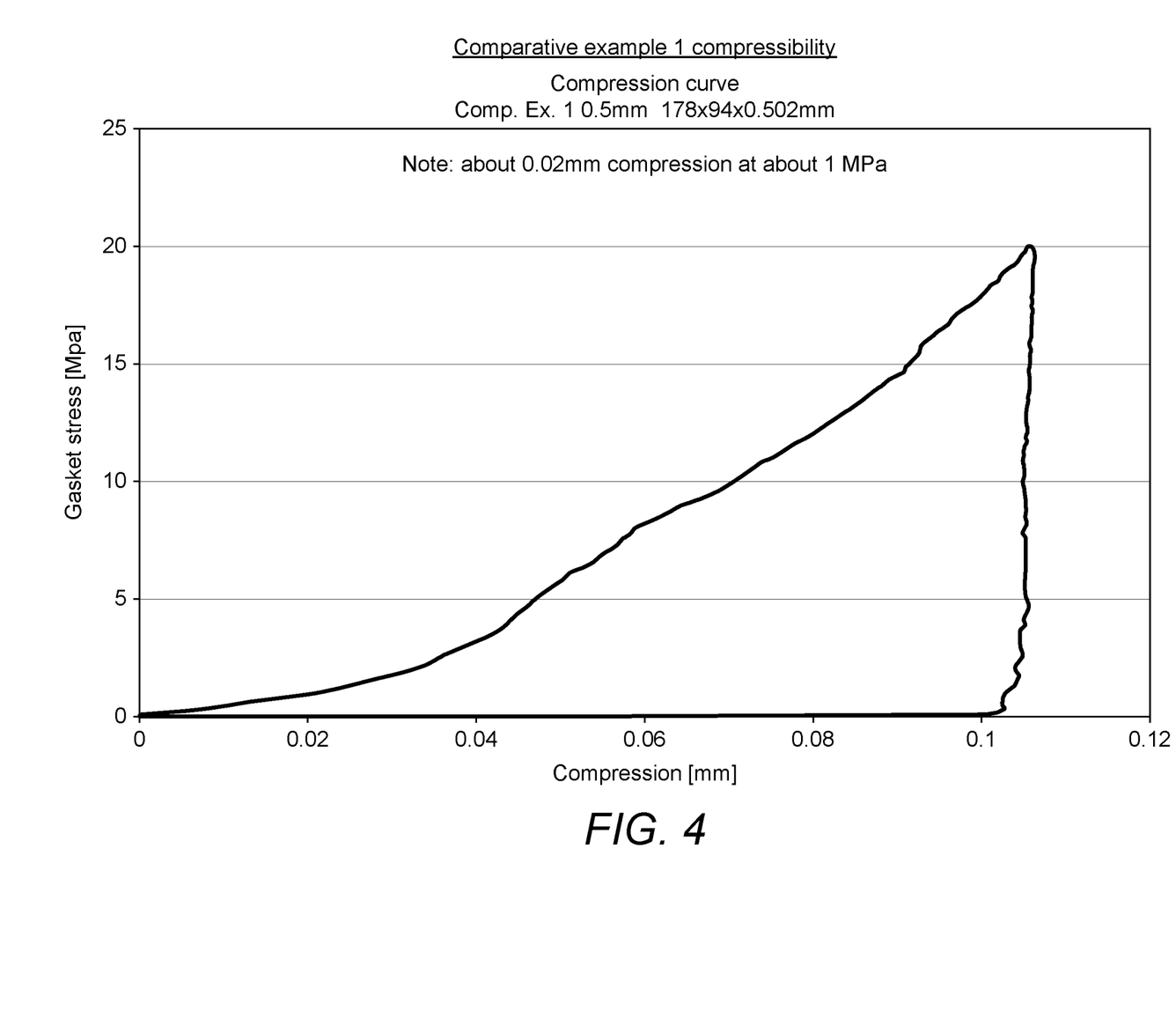
FIG. 4 is a compression curve for a comparative gasket.
Figure 5:
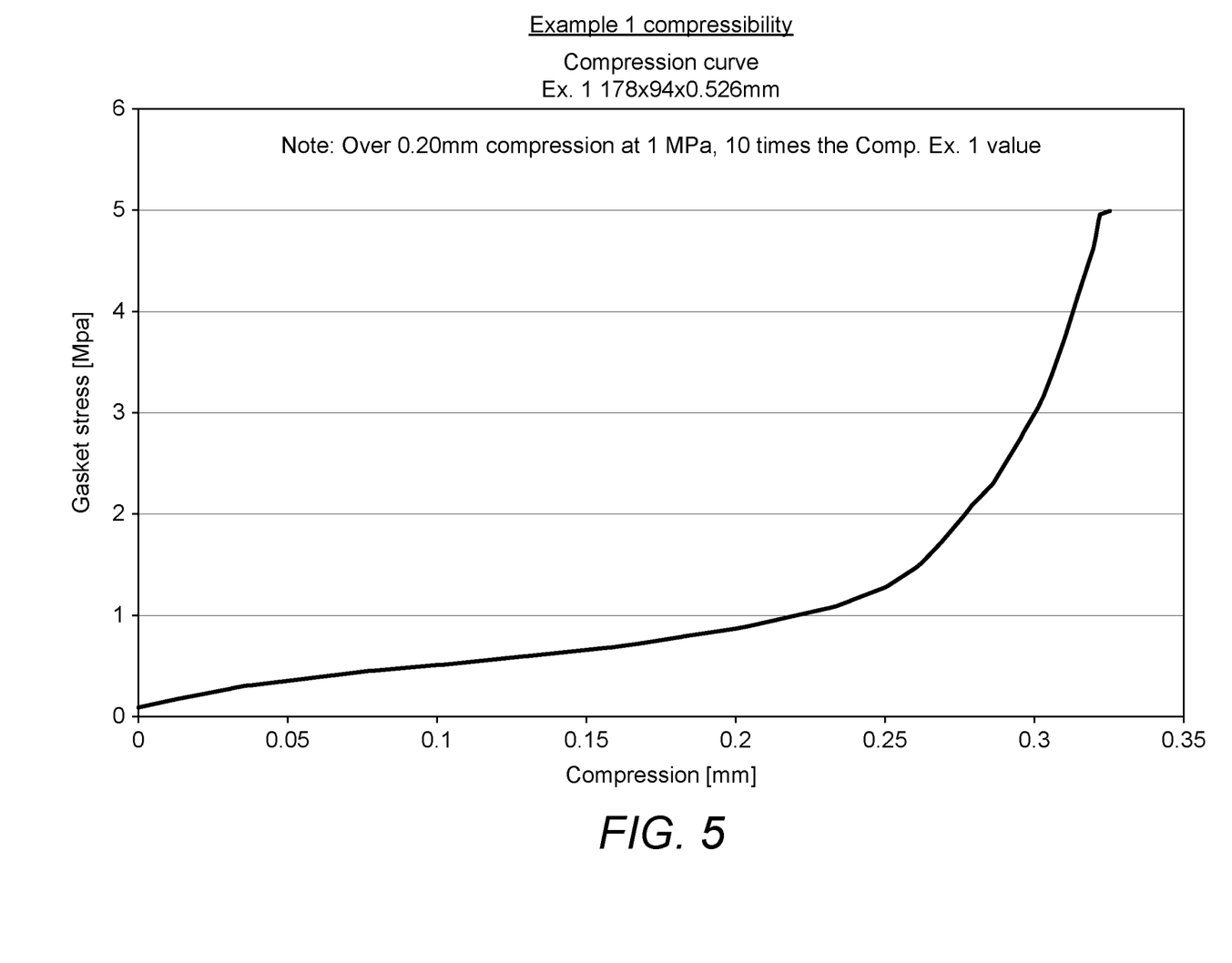
FIG. 5 is a compression curve for a gasket described herein.

Test samples of Example 1 and Comparative Example 1 produced as described above were subjected to a compression test using the following test conditions:

Apparatus: hydraulic press with LVDTs to measure the thickness (three LVDTs, 120 degrees apart)
Rate of compression: 0.1 MPa per second.
The mating flanges had surface roughness (Ra) of 3.2 micrometers.
The dimensions of the test samples were 178×94×0.5 mm.
FIGS. 4 and 5 show compressibility curves for the test samples of comparative example 1 and example 1 respectively. Example 1 shows much lower stress under equivalent compression than comparative example 1.

Figure 6:
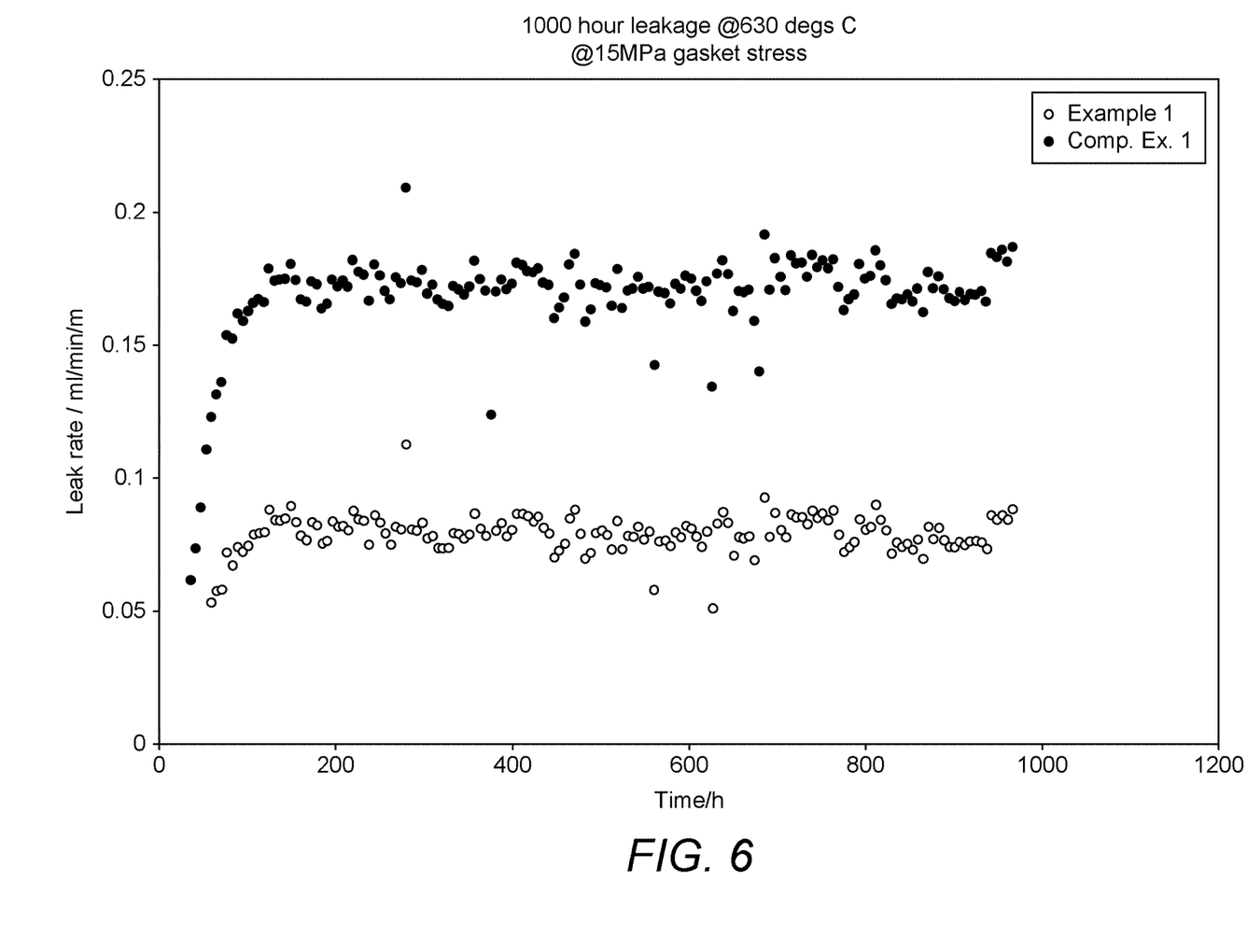
FIG. 6 is a graph of leak rate as a function of time for a gasket described herein and a comparative gasket.

FIG. 6 shows the 1000 hours leak rate at 630° C. and 15 MPa gasket stress for sealing materials in accordance with example 1 and comparative example 1. Clearly, the gasket of example 1 has a much lower leak rate on average.

Where values are given in % w/w herein these are based on dry weight unless indicated otherwise.

By the term "about" herein we mean±10%.

By average particle size is meant $d_{50}$ and may be determined using a Malvern Mastersizer 3000 Hydro.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A gasket sealing material for a fuel cell comprising:
   at least 25% dry w/w chemically exfoliated vermiculite; and
   at least 15% dry w/w plate-like filler;
   wherein the chemically exfoliated vermiculite and the plate-like filler are intimately mixed,
   wherein the plate-like filler has an average particle size of less than or equal to 10 µm, and
   wherein the gasket sealing material has a density prior to use of less than or equal to 1.1 g/cm³.

2. The gasket sealing material according to claim 1, wherein the plate-like filler is talc.

3. The gasket sealing material according to claim 1, wherein the plate-like filler is present at at least 25% dry w/w gasket sealing material.

4. The gasket sealing material according to claim 1, wherein the chemically exfoliated vermiculite is present at at least 30% dry w/w gasket sealing material.

5. The gasket sealing material according to claim 1, wherein more than 25% dry w/w of the plate-like filler in the gasket sealing material has an average particle size of greater than 2 µm.

6. The gasket sealing material according to claim 1, wherein the plate-like filler has an average particle size of from 2 to 10 µm.

7. The gasket sealing material according to claim 1, comprising a combination of chemically exfoliated vermiculite and plate-like filler in excess of 95% dry w/w.

8. A gasket for sealing two mating surfaces of a fuel cell comprising at least one sealing layer comprising the gasket sealing material according to claim 1 and at least one of a core layer, a support layer, or a coating layer.

9. A fuel cell or fuel cell component comprising one or more gaskets according to claim 8, wherein each of the one or more gaskets is located between two mating surfaces of the fuel cell or fuel cell component.

10. A fuel cell or fuel cell component comprising the gasket sealing material according to claim 1, wherein the gasket sealing material is located between two mating surfaces of the fuel cell or fuel cell component.

\* \* \* \* \*